Sept. 1, 1964  H. A. BERLINER ETAL  3,146,508
APPARATUS FOR EXTRUDING REINFORCED MEMBERS
Filed Nov. 3, 1959  5 Sheets-Sheet 3

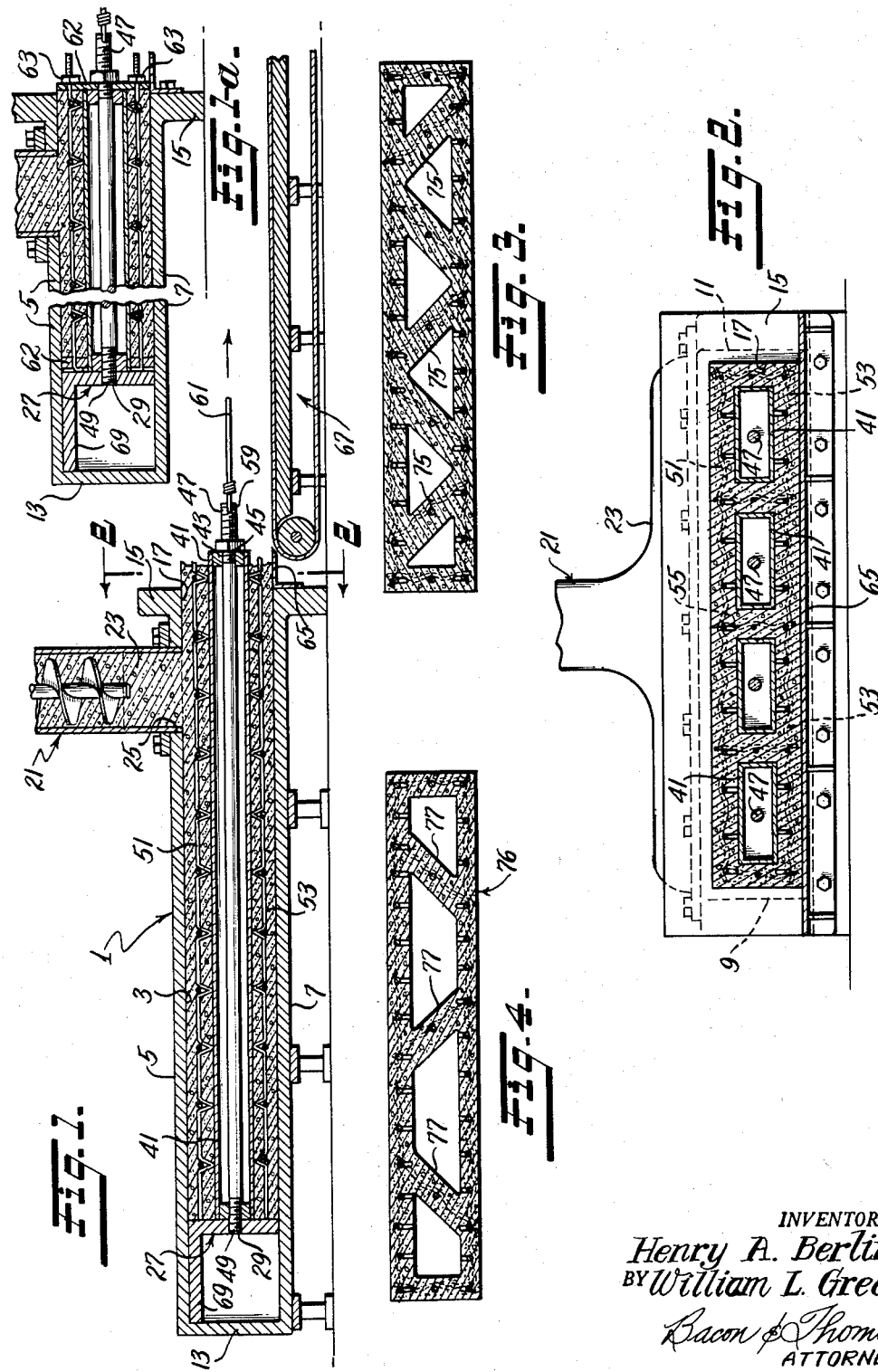

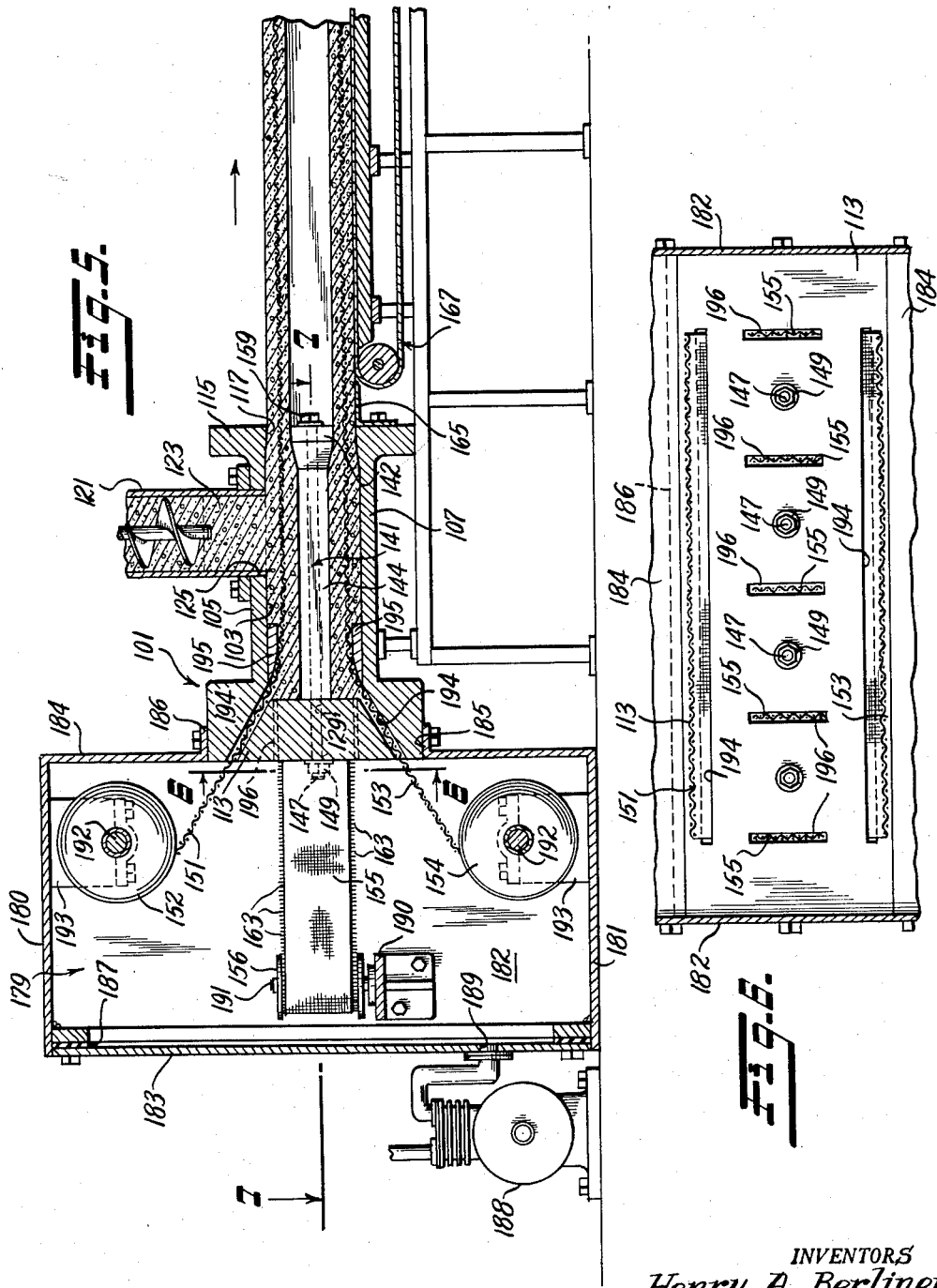

INVENTORS
Henry A. Berliner
BY William L. Greene
Bacon & Thomas
ATTORNEYS

Sept. 1, 1964  H. A. BERLINER ETAL  3,146,508

APPARATUS FOR EXTRUDING REINFORCED MEMBERS

Filed Nov. 3, 1959  5 Sheets-Sheet 4

INVENTORS
Henry A. Berliner
BY William L. Greene
Bacon & Thomas
ATTORNEYS

Sept. 1, 1964 H. A. BERLINER ETAL 3,146,508
APPARATUS FOR EXTRUDING REINFORCED MEMBERS
Filed Nov. 3, 1959 5 Sheets-Sheet 5

INVENTORS
Henry A. Berliner
BY William L. Greene
Bacon & Thomas
ATTORNEYS

United States Patent Office 3,146,508
Patented Sept. 1, 1964

3,146,508
APPARATUS FOR EXTRUDING REINFORCED MEMBERS
Henry A. Berliner, 2841 Tilden St. NW., Washington, D.C., and William L. Greene, 18 Weems Creek Drive, Annapolis, Md.
Filed Nov. 3, 1959, Ser. No. 850,656
17 Claims. (Cl. 25—14)

This invention relates generally to the extrusion of cementitious material or the like in the form of panels and related structural elements, and, more particularly, to the extrusion of such elements wherein various types of reinforcing materials may be employed. Wire mesh or perforated sheet metal are typical of the reinforcing materials to be employed.

Current practices in the art of extruding cementitious material, where a true extrusion operation is employed, are limited to those processes wherein only the simplest type of reinforcement means is employed, i.e. wires or rods of uniform cross-section. In my copending application, Serial No. 837,995, filed September 3, 1959, various means are disclosed whereby reinforcing members of non-uniform cross-section may be introduced into the extrusion chamber without any loss of extruded material at the point of introduction, the reinforcement means passing through the chamber and emerging at the die orifice as a part of the extruded product. The present case is related in that reinforcing material may be incorporated into the product in generally the same manner. Here, however, the extruded products contemplated are wide panels which are cored throughout their lengths and therefore cellular in cross-section. Reinforcing elements such as wire mesh sheets or perforated sheet metal are introduced into the extruded material to lie in parallel planes adjacent the opposite faces of the panel and in the transverse webs therebetween.

It is therefore a primary object of the present invention to provide means for the introduction of reinforcement sheets into an extrusion chamber for incorporation in the final product in parallel horizontal planes and in transverse, generally vertical planes therebetween.

Another primary object is to provide a means whereby coring elements are employed to form the extruded product to the desired cross-sectional configuration having open passageways or cells therein.

Another object is to provide an apparatus for sequentially extruding single complete panels having parallel reinforcement means along either face thereof and other reinforcement means lying between and substantially perpendicular to the parallel reinforcement means.

Another object is to provide an apparatus to extrude pre-stressed panels of the type described above.

Another object is to provide an apparatus for extruding cellular panels having opposed spaced face panels and transverse interior connecting webs therebtween and for introducing sheet reinforcement means into the product being extruded through said face portions and said webs.

Another object is to provide an apparatus for extruding cementitious material or the like into panel members of the type described above, wherein sheet reinforcement means are introduced in different planes into the extrusion chamber and incorporated in the final product, without any substantial loss of the material occurring at the point where the reinforcing means are introduced.

Still another object is to provide an apparatus for the continuous extrusion of cellular panels which are reinforced in such a way that they acquire extremely high strength characteristics.

Still another object is to provide an apparatus of the type described above which is economical in operation and readily adapted to form panels having a wide range of configurations.

Other objects and advantages will be apparent from the following description when read in conjunction with the accompanying drawings, in which:

FIG. 1 is a longitudinal sectional view taken through the center of an extrusion apparatus which incorporates the principles of the present invention;

FIG. 1a is a fragmentary longitudinal sectional view taken centrally through an extrusion apparatus similar to that of FIG. 1, a modified form of the invention being shown;

FIG. 2 is a front elevation of the apparatus as taken on the line 2—2 of FIG. 1;

FIG. 3 is a cross-sectional view illustrating an alternative form of the final product, which may be formed with apparatus of the type illustrated in FIG. 1;

FIG. 4 is a second alternative form of the final product which may be formed with apparatus of the type illustrated in FIG. 1;

FIG. 5 is a longitudinal sectional view illustrating another embodiment of the invention;

FIG. 6 is a fragmentary sectional view taken on the line 6—6 of FIG. 5;

Figure 7:
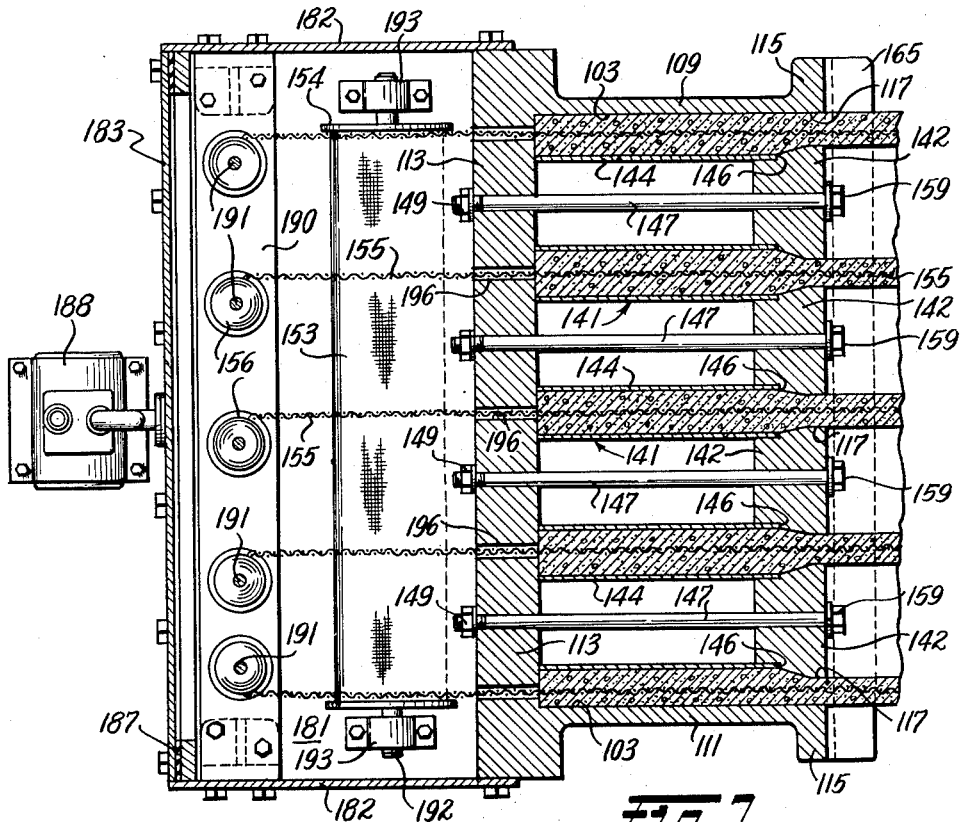
FIG. 7 is a horizontal sectional view taken on the line 7—7 of FIG. 5.

Referring now in more detail to the drawings, and to the embodiment disclosed in FIGS. 1 and 2 thereof, the extrusion apparatus, generally indicated by the numeral 1, comprises a chamber 3 which is generally rectangular in cross-section, being from 2 to 18 feet wide, and from 3 to 8 inches in height. The chamber is defined by top and bottom walls 5 and 7, respectively, side walls 9 and 11, and a rear wall 13 sealing the back end of the chamber. The front wall 15 of the chamber is provided with a longitudinal slot 17 of the desired configuration which serves as a die orifice to shape the material being extruded. It will be understood that the shape or size of the die orifice may vary in accordance with the requirements of the extruded product, and that the present extruder apparatus can be adapted to extrude different shapes by employing interchangeable face plates having die orifices of different sizes and configurations, as taught in applicant's copending application cited above.

A pump 21 is provided, which has an inlet (not shown) in communication with a hopper or similar source of supply. The pump illustrated is of the conventional screw type, but it will be understood that other types of pumps may be employed if desired. As best shown in FIG. 2, the pump 21 has its outlet in communication with a wide-mouthed conduit 23 which in turn connects with a transversely elongated opening 25 formed in the top wall 5 of the extruder 1 adjacent the front end thereof. Thus, cementitious material or the like is delivered from the pump 21 into the chamber 3 across a wide area. Baffle means (not shown) may be employed to equalize the distribution of the material across this area. The pump 21 effects pressures up to 300 p.s.i. or more in the chamber 3.

A piston element 27 is positioned within the chamber 3, and conforms closely with the cross-sectional configuration thereof to effect a snug working fit with the walls 5, 7, 9 and 11. Piston 27 is provided with a plurality of spaced attachment means, such as threaded apertures 29, positioned in laterally spaced relations across the width thereof to facilitate the mounting of spaced core members 41 in the respective positions desired. The core pieces 41 may be formed of rigid cardboard or the like, intended to be left within the extruded product, or may be removable cores of the wedge type or any other conventional type. In the present illustration the cores 41 are cardboard, and may be provided with internal ribs or other reinforcing means (not shown) to withstand the pressure existing within the chamber. The opposite ends of each core are closed by plug members 43. Apertures 45 are formed in the center of each plug member and serve to mount a shaft 47 centrally of each core 41, extending the entire length thereof. The inner ends 49 of the shafts 47 are threaded into the respective apertures 29 to removably connect the core pieces 41 to the piston 27 in the laterally spaced relation.

The wire mesh reinforcing means may be pre-assembled and in the present instance comprises upper and lower sheets of mesh 51 and 53 positioned in superimposed spaced relationship with interconnecting, generally vertical spaced webs 55 of sheet mesh or perforated sheet material therebetween. As shown in FIGS. 1 and 2, a plurality of depressions or "chairs" are formed in the wires of the upper and lower sheets 51 and 53 and serve to space the reinforcing material from the respective cores 41. The web sheets 55 are positioned to lie centrally between core members 41 and also along the outside of the two outermost cores.

The forward ends 59 of the rods 47 are connected as by cable means 61 to any suitable source of power (not shown) so that an application of force tending to pull the rods 47 out of the mouth of the extruder, will in turn pull the piston 47 to force the material being extruded through the orifice 17. The application of force in this manner through the piston 27 must be counterbalanced by the application of pressure by the pump 21 to prevent backflow through conduit 23.

A ledge 65 may be provided along the bottom of the orifice 17 to assist movement of the extruded product to a driven conveyor or the like, such as the one illustrated diagrammatically at 67 in FIG. 1. The conveyor 67 is aligned with the orifice 17 to receive and support the extruded product as it emerges.

In operation, it will be seen that material delivered through pump 21 is distributed under pressure throughout the extrusion chamber and, with the reinforcing means and cores, emerges from the orifice 17 in the desired shape, passing on to the conveyor 67. The piston 27 follows behind the extruded product, forcing it through the die orifice.

Piston 27 is provided with a rearwardly extending upper flange 69, which extends the entire width of the chamber. When the piston reaches its forwardmost position, it will be seen that the flange 69 serves as a valve to prevent the entry of additional material through the opening 25 behind the piston. At this point, the core pieces and surrounding extruded product may be detached from the piston by rotating shaft ends 59 to unscrew the shafts from the respective apertures 29 in piston 27. The extruded panel may then be removed to cure, and a new set of core pieces and preassembled reinforcement means are mounted in the same manner on the piston 27. The piston is then retracted for the next operation, and communication with the pump 21 is re-established as the flange 69 moves rearwardly, and the chamber 103 is refilled.

In the embodiment of FIGS. 1 and 2 the core pieces 41 are rectangular in cross section but, as stated above, they may be varied to obtain whatever interior configuration is desired. It will be readily understood therefore that conventional truss-shaped extruded members 75 (FIG. 3) may be formed, as well as panels 76 (FIG. 4) having trapezoidal interior cavities 77, or innumerable other shapes.

As shown in FIG. 1a the ends of longitudinal wires of the reinforcing mesh may be extended through opposed lateral members 62 of a pre-stressing frame being secured fixedly by any suitable means at the rear thereof. The forward end may be threaded to cooperate with a conventional pre-stressing nut 63 or the like which is positioned in advance of the front member 62 and is adapted to apply tension to the respective wires.

Referring now to the embodiment of FIGS. 5, 6 and 7, an extruder apparatus generally indicated by the numeral 101 is provided for the continuous extrusion of structural panels of the type shown in FIGS. 2, 3 and 4. The present embodiment includes a chamber 103 defined by top and bottom walls 105 and 107, side walls 109 and 111, rear wall 113, and front wall 115. An opening 117 is formed in the front wall 115 to provide a die orifice, and an opening 125 is provided in the top wall 105 for the introduction of material through a conduit 123 under the force of a pump 121, as in the case of the embodiment of FIGS. 1 and 2. In the present example, a plurality of fixed core members 141 are provided, which comprise coring blocks 142 spaced from the rear wall 113 by tubular sleeves 144. The outer ends of sleeves 144 are received in annular shoulders 146 formed adjacent the inner end of core blocks 142. The core blocks 142 may be tapered to diverge outwardly as indicated in FIG. 7, to compact the material as it emerges from the die orifice. A rod 147 having a head 159 at the forward end thereof is inserted through an axial bore in each block 142 and extends through the respective sleeve 144 and through an opening 129 in rear wall 113. A nut 149 is threaded on the inner end of rod 147 to secure the core assembly 141 rigidly in position within the chamber. It will be understood, however, that the cores can be readily removed and replaced by cores of different configurations when desired, to alter the shape of the final product. A ledge 165 may be mounted below the orifice 117 on the face of front wall 115 to cooperate with conveyor means such as illustrated at 167 to facilitate delivery of the extruded product from the apparatus.

An air-tight chamber 179 is mounted at the rear of the extruder apparatus 101, being defined by top and bottom walls 180 and 181, side walls 182, rear wall 183, and front wall 184. The front wall 184 is provided with an opening 185 having a forwardly extending flange 186 therearound. The opening 185 corresponds with the cross-sectional configuration of the back end of extruder 101 which is received therein, the flange 186 surrounding rear wall 113 and being suitably sealed to prevent the escape of air from the chamber 179. The rear wall 183 of chamber 179 may be removably mounted, as illustrated, suitable sealing means 187 being provided. An air pump 188 is placed in communication with the interior of chamber 179 as through an opening 189 formed in the rear wall 183.

At the rear of the chamber 179 is mounted a transverse support 190 secured between the opposed side walls 182. Vertical reinforcing sheet material 155 is delivered from reels 156 rotatably mounted on spindles 191, which are in turn secured in laterally spaced relation along the top of support member 190. Similarly, upper and lower horizontal reinforcing sheets 151 and 153 of wire mesh or the like are delivered from reels 152 and 154, respectively, these reels being mounted on shafts 192 between bearing blocks 193 mounted on the top and bottom walls 180 and 181. The upper and lower reinforcing sheets 151 and 153 are delivered into the chamber 103 through angular slots 194 in the rear wall 113, and are guided into position by tapered wedge members 195 for incorporation in the extruded product. Similarly, the vertically disposed sheets 155 are delivered through vertical slots 196 in the rear wall 113, and pass into the chamber 103 in position between the upper and lower reinforcing means. Thus, the various reinforcing sheets are incorporated into the extruded product on all sides of the cores 141 as the material is forced by pump 121 through the die orifice 117. The sheets 155 may have projecting upper and lower wire ends 163 which extend through the mesh of sheets 151 and 153 and are interlocked therewith by being bent over under the influence of wedge members 195. Pressure from the air pump 188 is maintained at a level equal to the pressure effected by the pump 121 in the rear portion of chamber 103 to prevent a backflow of cementitious material through the slots in the rear wall.

It will be noted that the mesh sheets 151, 153, and 155 are fed freely from the respective reels and are drawn through the extrusion chamber 103 and out the die orifice 117 by the force of material pumped through the chamber by pump 121 and by any additional force applied to the free end of the mesh. This latter force will overbalance any braking action which might be applied to the respective reels to control the unreeling. The finished product is severed by any conventional means (not shown) to effect separate panels of the desired length.

Figure 8:
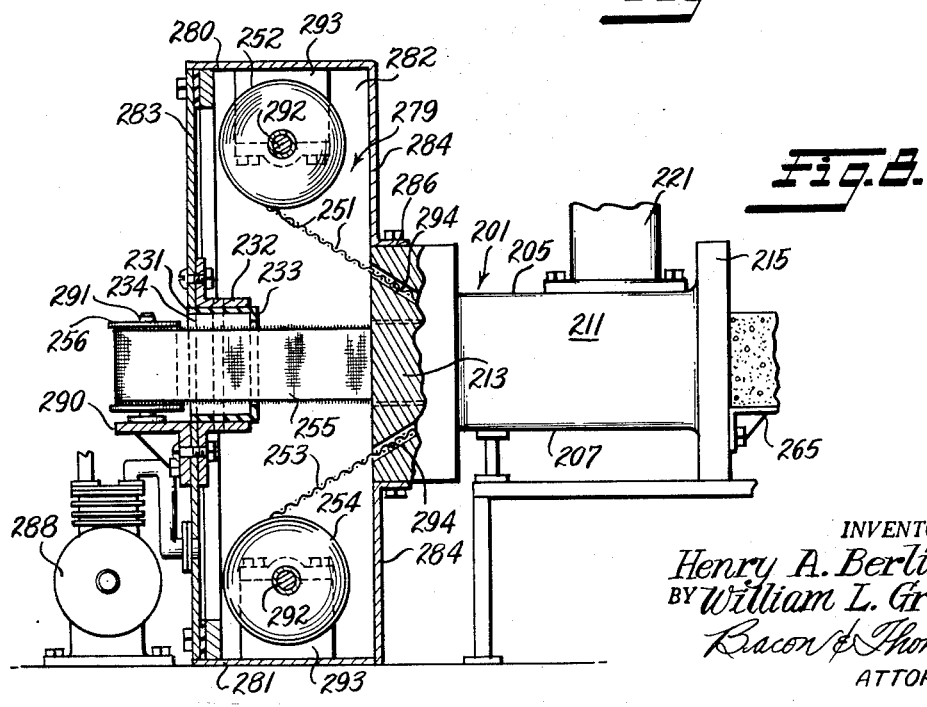
FIG. 8 is a side elevation illustrating another embodiment of the present invention, portions thereof being shown in section.
Figure 9:
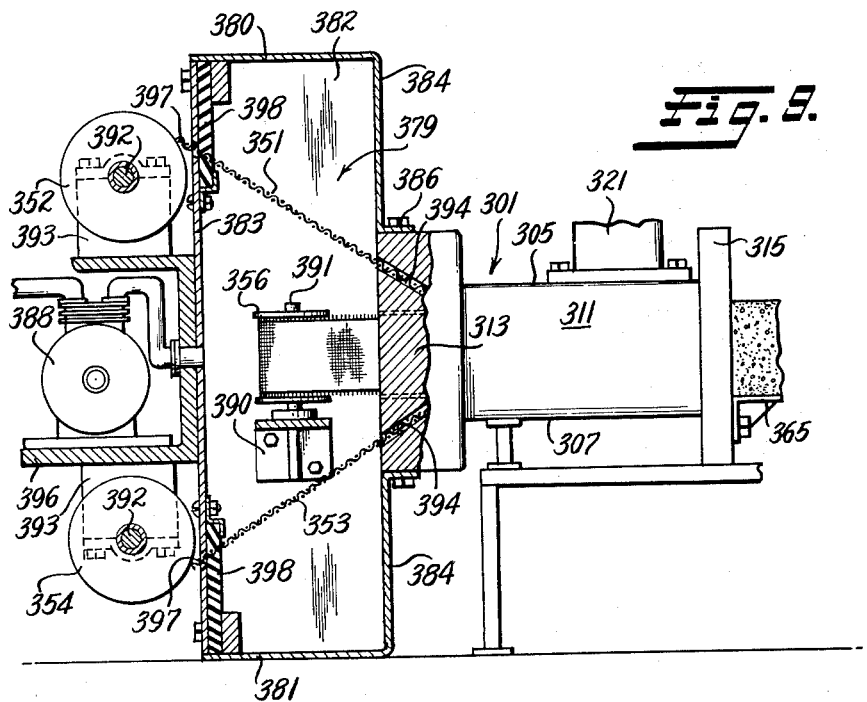
FIG. 9 is a side elevation illustrating another embodiment of the present invention, portions thereof being shown in section.

The embodiments of FIGS. 8 and 9 are quite similar to that shown in FIGS. 5, 6, and 7 and corresponding elements have been given the same numbers in the 200 and 300 series, respectively. In FIG. 8 the air-tight chamber 279 is smaller in size than the chamber 179 and houses only the reels 252 and 254 which supply the horizontally extending sheets of mesh. The rear wall 283 is provided with a series of spaced, laterally aligned openings 231, each surrounded by an internally extending flange 232 lined with Teflon or the like such as indicated at 233. A pair of sealing rollers 234 are mounted within and substantially fill each opening 231 with their outer peripheries in close contact. These rollers 234 are mounted on vertical axes but are otherwise similar in principle and construction to those shown in my copending application, to which reference is made above, and will not be described in detail here.

A supporting member 290 is mounted along the outer surface of rear wall 283 below the opening 231 and serves to mount a plurality of spindles 291 for the vertically rotatable reels 256. The mesh sheet 255 is therefore fed between opposed pairs of rollers 234 into the chamber 279 without loss of air at the point of introduction and passes in turn into the extrusion chamber of extruder 201.

In FIG. 9 the chamber 379 is comparable in size to the chamber 279 in FIG. 8 and in this embodiment houses only the plurality of the reels 356 which are mounted on spindles 391 supported on a transverse support member 390. Reels 352 and 354 are positioned outside the chamber in this embodiment and may be mounted on shafts 392 supported between bearing blocks 393 secured to the rear wall 383 as by a pump-supporting frame 396. The mesh sheets 351 and 353 are fed through slots 397 in the rear wall 383 and through aligned slots in resilient sealing blocks 398 mounted immediately inwardly of the wall 383. The sealing blocks 398 are also similar in principle and construction to those shown in my above-cited copending application and will not be disclosed in detail here.

Figure 10:
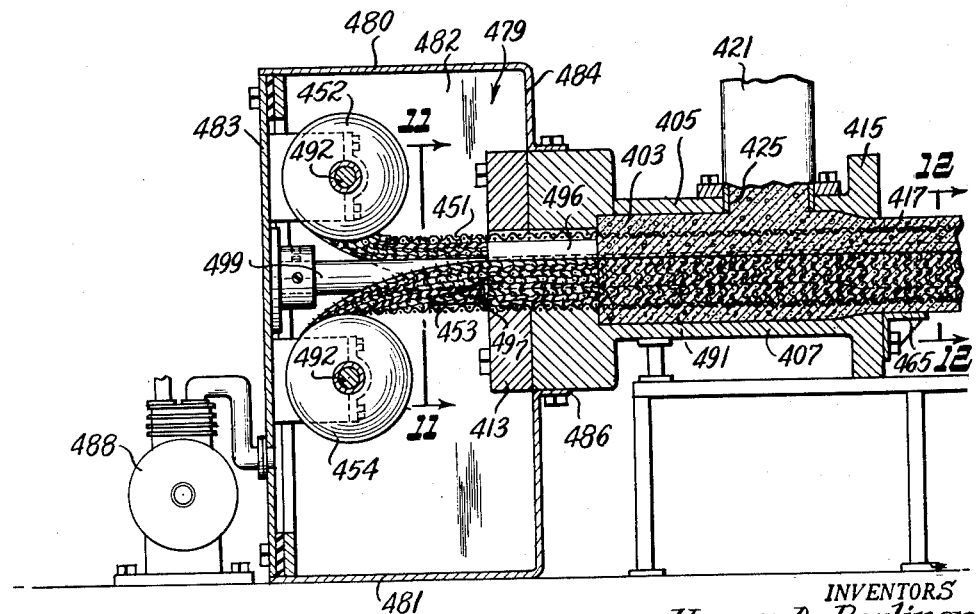
FIG. 10 is a longitudinal sectional view taken through the center of another embodiment of the invention.
Figure 11:
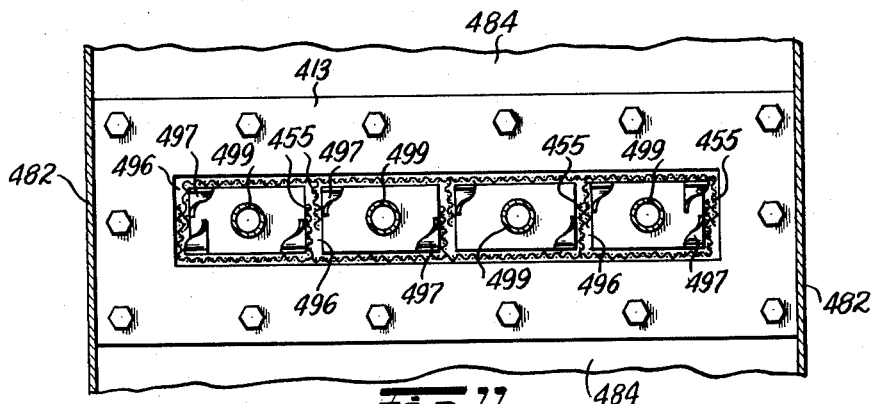
FIG. 11 is a fragmentary sectional view taken on the line 11—11 of FIG. 10.
Figure 12:
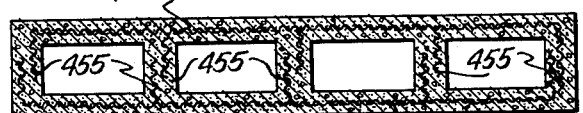
FIG. 12 is a sectional view taken on the line 12—12 of FIG. 10.

In the embodiment of FIGS. 10, 11, and 12 a different form of reinforcing material is employed. This comprises upper and lower parallel sheets 451 and 453, of wire mesh or the like, each of which is provided with a plurality of spaced wire mesh flange elements 455 foldably secured thereto throughout the entire length thereof. The flange elements 455 are originally turned down to lie closely against the plane of mesh sheets 451 and 453 when the material is reeled up. As it is unreeled these flanges tend to open to a perpendicular position with respect to the sheets and are positively guided into this position by appropriately shaped guide members 497 to enable corresponding flange elements from the respective sheets to pass through vertical slots 496 in the rear wall 413 of the extrusion chamber 403. The cores 491 are mounted on the portions of rear wall 413 between adjacent slots 496 and these portions are in turn supported as by horizontal beams 499 from the back wall 483 of the air chamber. It will be seen that corresponding pairs of oppositely directed flanges 455 are caused to overlap and lie in close proximity to each other or in actual contacting relation as they pass through chamber 403. Accordingly, the web portions of the panel are reinforced in substantially the same manner as those produced by the methods described earlier.

Figure 13:
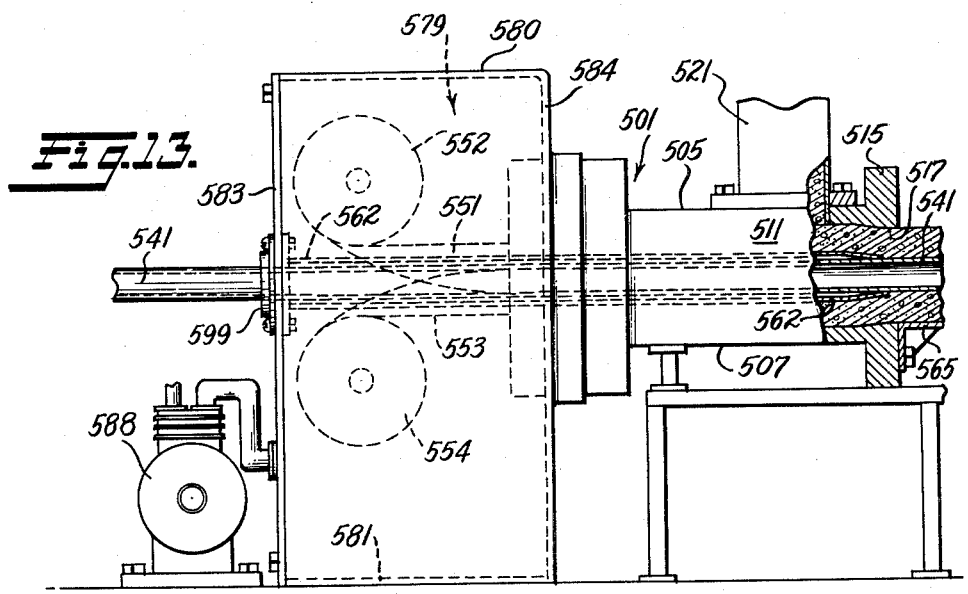
FIG. 13 is a side elevational view showing a modification of the embodiment of FIGS. 10–12, dotted lines being employed to illustrate diagrammatically the basic arrangement of structure within the chamber.

An alternative form of this embodiment is shown in FIG. 13. In this form disposable cores 541 are fed continuously or sequentially through the rear wall 583 of the chamber 579, and between erected flanges 555 corresponding to flanges 455, an air seal 599 of any suitable type being provided on the wall 583 for each core. In this form the cores 541 are introduced into the extrusion chamber for incorporation in the final product emerging from the die orifice. The cores 541 are therefore fed in timed relation with respect to the movement of the extruded material and reinforcing material. To protect cores 541 against the pressures within the chamber they may be guided through rigid sleeves 562 mounted on rear wall 583 and extending therefrom to the vicinity of the respective die orifices 517.

The panels formed from the invention as described above possess high strength characteristics by virtue of the reinforcing material employed and can be used in numerous environments as walls, wall portions, ceilings, floors, curtain walls, and many other structural units.

It will be understood that while specific embodiments of the present invention are disclosed herein, numerous modifications and changes may be made without departing from the spirit of the invention or the scope of the annexed claims. It is particularly noted that while the invention has been described with respect to the use of cementitious material, it is contemplated that it can be used or adapted to be used with a wide range of extrudable material including plastics, ceramics, or the like. The term "cementitious material" is therefore to be considered as encompassing all of such materials.

We claim:

1. Extruder apparatus for forming reinforced panels, comprising: wall means defining an extrusion chamber having an inlet and an outlet; pump means connected to said inlet to deliver extrudable material under pressure from a source of supply to said chamber, said outlet being shaped to define an elongated die orifice; means for guiding vertically spaced, parallel sheets of reinforcing material through said chamber and through said die orifice in substantially planar, vertically spaced, parallel relation; means for guiding a plurality of spaced sheets of reinforcing material through said chamber and through said die orifice along upright spaced planes extending between said parallel sheets, said plurality of sheets substantially spanning the space between said parallel sheets, whereby all of said sheets are incorporated in the aforementioned relative positions in the extruded product as it emerges from the die orifice.

2. The apparatus of claim 1, wherein coring means are provided between adjacent ones of said plurality of spaced sheets to thereby form longitudinally extending openings in said extruded product.

3. The apparatus of claim 2, wherein said coring means comprises a plurality of laterally spaced cores mounted between said plurality of spaced sheets for movement with said reinforcing material through said chamber and through said die orifice.

4. The apparatus of claim 2, wherein said coring means comprises a plurality of coring blocks fixed in position at the mouth of said die orifice.

5. The apparatus of claim 4, wherein said coring blocks are supported from the rear wall of said chamber.

6. Extruder apparatus for forming reinforced panels, comprising: wall means defining an extrusion chamber having an inlet and an outlet; pump means connected to said inlet to deliver extrudable material under pressure from a source of supply to said chamber, said outlet being shaped to define an elongated die orifice; means for feeding sheets of reinforcing material into said chamber; means for guiding said sheets in substantially planar, vertically spaced, parallel relation through said chamber and through said die orifice; means for feeding a plurality of other sheets of reinforcing material into said chamber for passage through said chamber and through said die orifice along spaced upright planes extending transversely to and substantially spanning the gap between said spaced parallel sheets, whereby said sheets are incorporated in the aforementioned relative positions in the extruded product as it emerges from the die orifice.

7. The apparatus of claim 6, wherein means are provided for sealing said chamber at the points of introduction of said reinforcing material to prevent loss of the material being extruded.

8. The apparatus of claim 7, wherein said reinforcing means are fed into said chamber through slots in the rear wall thereof and wherein said sealing means comprises an air chamber mounted behind said extrusion chamber and in communication with the portion of said rear wall thereof where said slots are formed, an air pump being provided in communication with said air chamber to equalize the pressure therein with the pressure in said extruder.

9. The apparatus of claim 8, wherein all of said sheets are fed from reels mounted within said air chamber.

10. The apparatus of claim 8, wherein certain of said sheets are fed from reels mounted within said air chamber, the other sheets being fed through the rear wall of said air chamber and said rear wall being provided with sealing means to prevent the escape of air at the point where said other sheets are passed therethrough.

11. Extruder apparatus for forming reinforced panels, comprising: wall means defining an extrusion chamber having an inlet and an outlet; pump means connected to said inlet to deliver extrudable material under pressure from a source of supply to said chamber, said outlet being shaped to define an elongated die orifice; reel means for feeding sheets of reinforcing material into said chamber in substantially planar, superimposed spaced relation, said sheets each having laterally spaced longitudinal flanges thereon opposed to corresponding flanges on the other sheet, said flanges including side flanges at either side of each of said sheets and an intermediate flange disclosed between each pair of said side flanges, all of said flanges being folded to lie flat against the surfaces of said sheets when said sheets are in reeled condition; means within said chamber for guiding said flanges into substantially planar upstanding relation with respect to said sheets as said sheets are being fed from said reel, corresponding pairs of flanges being thereby overlapped; and means within said chamber for guiding said reinforcing material through said chamber and through said die orifice, said overlapped pair of flanges being thereby incorporated into the extruded product as webs between said superimposed sheets.

12. The apparatus of claim 11, wherein coring means are provided within said chamber adjacent said die orifice to form longitudinal openings in said product between said longitudinal flanges as said product emerges from said die orifice.

13. The apparatus of claim 12, wherein said coring means comprises cores introduced at the rear of said extrusion chamber for delivery through said die orifice with said extruded product.

14. The apparatus of claim 13, wherein rigid means are provided to surround said cores throughout substantially their entire passage through said chamber to prevent said cores from collapsing under the pressures within said chamber.

15. The apparatus of claim 12, wherein said cores are rigidly mounted within said chamber.

16. Extruder apparatus for forming reinforced panels, comprising: wall means defining an extrusion chamber having an inlet and an outlet; pump means connected to said inlet to deliver extrudable material under pressure from a source of supply to said chamber, said outlet being shaped to define an elongated die orifice; means for holding spaced, parallel sheets of reinforcing material in pre-stressed condition; means for guiding said pre-stressed sheets of reinforcing material through said chamber and through said die orifice; means for holding a plurality of laterally spaced sheets of reinforcing material in pre-stressed condition; means for guiding said last mentioned plurality of spaced sheets of pre-stressed reinforcing material through said chamber and through said die orifice along spaced planes extending transversely to and substantially spanning the gap between said spaced parallel sheets, whereby said sheets are incorporated in the aforementioned relative positions in the extruded product as it emerges from the die orifice.

17. Extruder apparatus for forming reinforced panels, comprising: wall means defining an extrusion chamber having an inlet and an outlet; pump means connected to said inlet to deliver extrudable material under pressure from a source of supply to said chamber, said outlet being shaped to define an elongated die orifice; means for feeding sheets of reinforcing material into said chamber; means for guiding said sheets in substantially planar, vertically spaced, parallel relation through said chamber and through said die orifice; means for feeding a plurality of other sheets of reinforcing material into said chamber for passage through said chamber and through said die orifice along spaced upright planes extending transversely to and substantially spanning the gap between said spaced parallel sheets; means within said chamber for interlocking said sheets whereby said sheets are incorporated in the aforementioned relative positions in the extruded product as it emerges from the die orifice.

References Cited in the file of this patent

UNITED STATES PATENTS

| | | |
|---|---|---|
| 1,146,477 | Cole et al. | July 13, 1915 |
| 1,445,724 | Skorkovsky | Feb. 20, 1923 |
| 2,209,726 | Fleming | July 30, 1940 |
| 2,338,203 | Reedman | Jan. 4, 1944 |
| 2,413,911 | Dobell | Jan. 7, 1947 |
| 2,611,941 | Leitl | Sept. 30, 1952 |
| 2,878,544 | Dilday | Mar. 24, 1959 |